March 11, 1958 L. G. BOUGHNER 2,826,427
SELF-STEERING TANDEM AXLE ARRANGEMENT
Filed Sept. 16, 1954 3 Sheets-Sheet 1
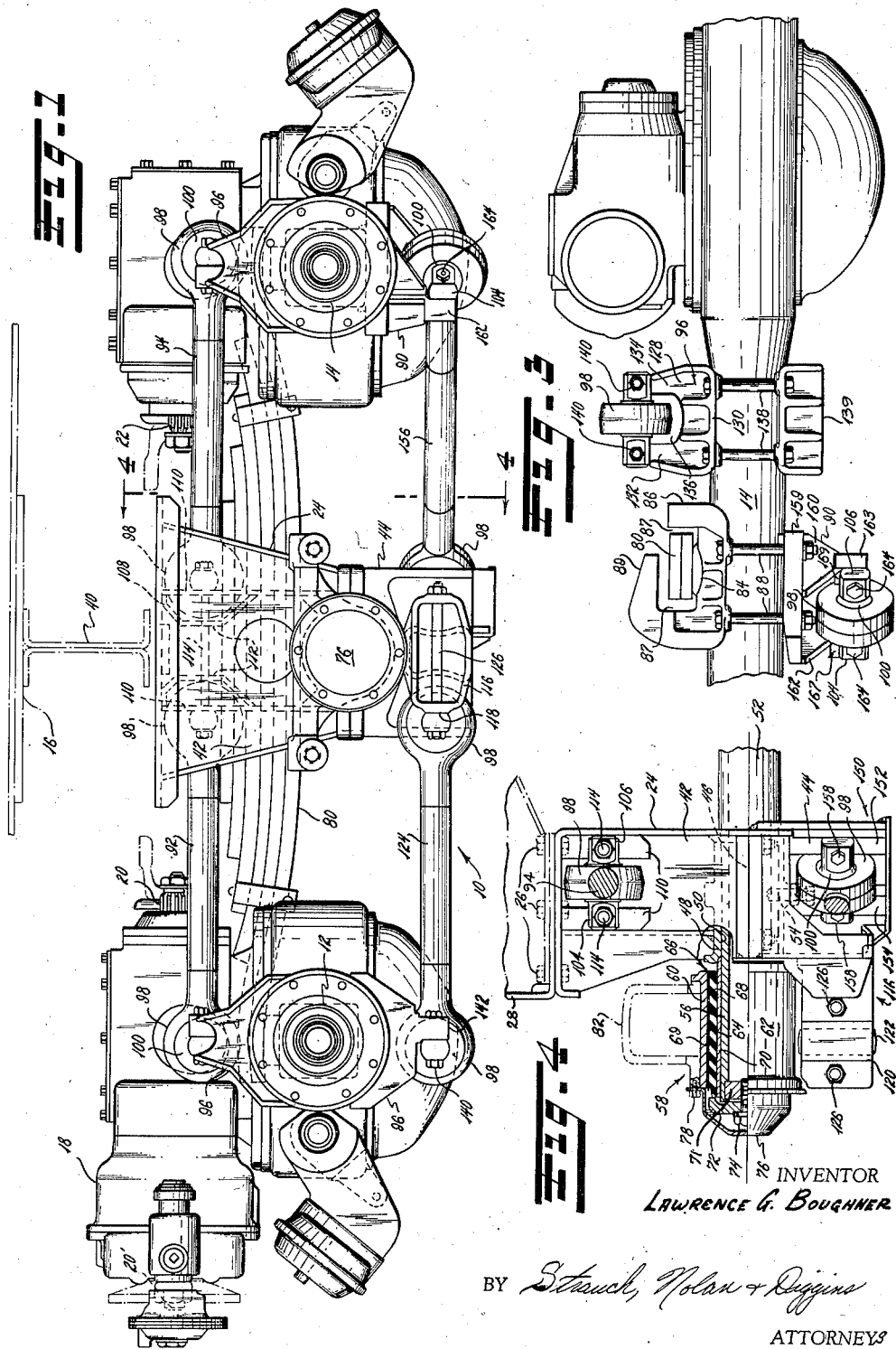
INVENTOR
LAWRENCE G. BOUGHNER
BY
ATTORNEYS

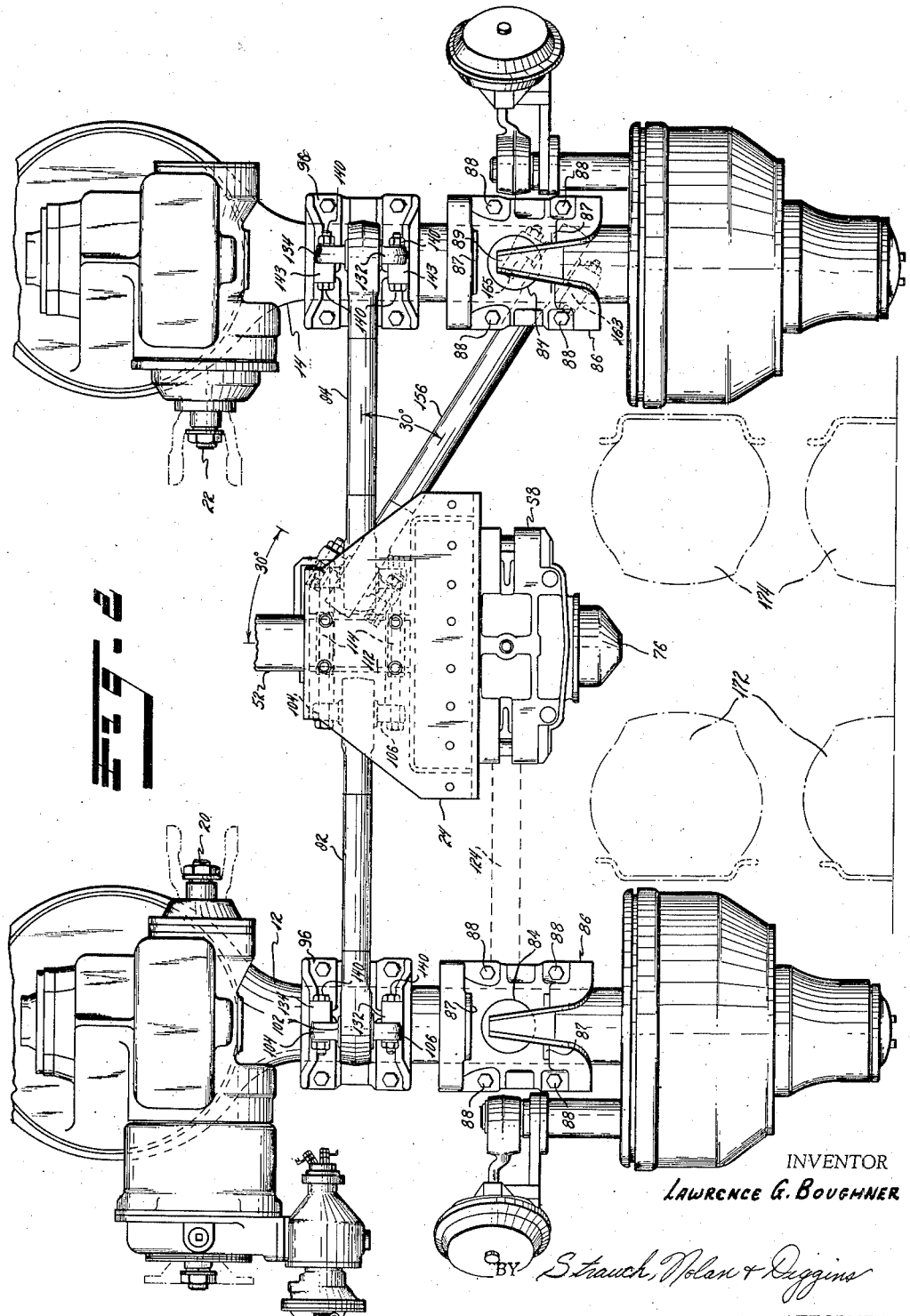

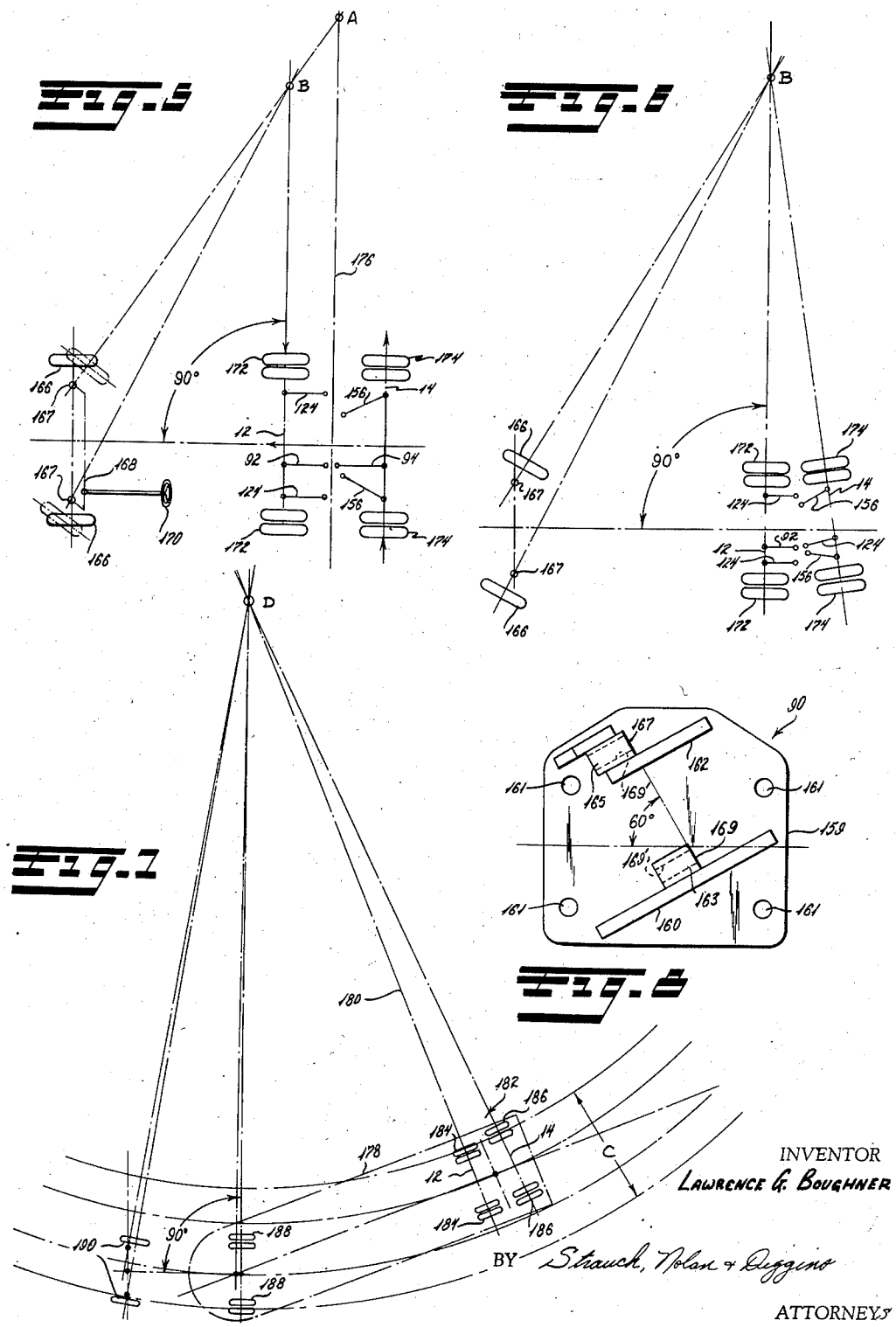

United States Patent Office 2,826,427
Patented Mar. 11, 1958

2,826,427

SELF-STEERING TANDEM AXLE ARRANGEMENT

Lawrence G. Boughner, Detroit, Mich., assignor to Rockwell Spring and Axle Company, Coraopolis, Pa., a corporation of Pennsylvania Application September 16, 1954, Serial No. 456,396

3 Claims. (Cl. 280—104.5)

The present invention relates to improvements in tandem axle assemblies for vehicles, and more particularly to a new and improved self-steering tandem drive axle suspension having a conventional forward axle and a self-steering rear axle.

When a vehicle equipped with a conventional tandem drive axle suspension turns, the motion of the tandem axle wheels is a combination of rolling and transverse sliding or skidding. This motion causes forces to develop at the tires which resist the tendency of the vehicle to turn and simultaneously tend to move the forward tandem axle toward the outside of the turn and the rear tandem axle toward the inside until any play in the suspension is taken up. Early tandem axle suspensions utilized a parallelogram torque rod suspension wherein both tandem axles were held firmly perpendicular to the vhicle frame. This construction tended to make steering difficult, particularly in the case of tandem axle trucks having a short wheel base. Where such vehicles had a heavy tandem axle load and a light steering axle load, steering was particularly difficult and even impossible on slippery roads.

An early attempt to overcome some of these difficulties is disclosed in the patent to Marcum, 1,935,746. This unit provides tandem axle steering by means of a pair of torque rods which extend forward and inward to a single connecting member which is slidable along a channel in a cross frame member of the vehicle chassis. A direct mechanical linkage from the steering column moves the slidable connecting member to thereby steer the rear tandem axle when the front wheels are turned. This suspension and steering arrangement was satisfactory for unitary vehicles but utilized a complex and expensive steering mechanism and could not be readily adapted to tractor trailer units.

The shortcomings of steered tandem axle suspensions of this type were recognized and an attempted solution set out in a patent to Buckendale, 2,435,199, which disclosed a tandem axle suspension utilizing resilient vertical supports and a pair of self-steering tandem axles. In that structure the tandem axles were made horizontally tiltable through the use of large numbers of universal joints which were coupled to a torque rod suspension mounted in specially designed heavy frame brackets on the vehicle chassis. Both axles were thus rendered rotatable to a limited degree and a special arrangement of resilient stops was provided in order to limit the axle movement with respect to the vehicle frame to prevent excessive twist or strain and to prevent the tires from contacting the vehicle chassis or any other part of the suspension mechanism. The self-steered tandem axles provided for a center of turn which lay upon a transverse line through the center of the tandem axle unit and were not adapted to use with conventional suspension springs.

According to the present invention there is provided a self-steering tandem axle suspension unit which provides all of the advantages of power steered units of the Marcum type while utilizing a simple spring suspension and torque rod system without any direct mechanical connection with the steering column. The unit disclosed is equally well adapted to use on unitary vehicles wherein one or more of the tandem axles may be driven or on a trailer where both tandem axles may be dead. The unit provides an inherently stable system with a short wheel base which permits the vehicles in which it is installed to have a shortened radius of turn. The self-steering effect is a direct function of the radius of curvature being travelled and is unaffected by speed or unequal load distribution.

It is accordingly a primary object of the present invention to provide a novel tandem axle suspension which is self-steering and which utilizes a conventional front axle and a self-steering rear axle without any direct mechanical connection with the steering column.

It is a further object of the present invention to provide such a tandem axle suspension unit wherein the self-steering rear axle is self-contained in the suspension unit and does not require separate heavy frame brackets.

It is another object of the present invention to provide such a tandem axle suspension unit wherein sidewise movement of the rear axle produces a swivelling effect through angularly mounted lower torque rods to cause the outer end of the axle to be moved back and the inner end of the axle to be moved forward to give a horizontal tilting self-steering effect upon turning.

It is another object of the present invention to provide the self-steering effect in the rear axle through the use of conventional torque rods, two of which are mounted at an angle to give the rear axle a horizontal tilting self-steering effect during turns.

It is a further object of the present invention to provide such a tandem axle suspension unit which makes possible shorter vehicle wheel bases and smaller minimum turning circles.

It is another object of the present invention to provide such a tandem axle suspension unit wherein increased axle spacing may be utilized without adding to steering difficulties.

It is still a further object of the present invention to provide a tandem axle suspension unit which may be utilized with one driven and one dead axle or with two dead axles for trailer use.

It is another object of the present invention to provide such a tandem axle suspension unit which, when utilized with tractor-trailer vehicles, makes smaller road widths possible.

It is another object of the present invention to provide a tandem axle suspension unit having built-in self-steering limits mounted upon the axles thereof so as to provide for positive clearance between the vehicle frame and tires and to prevent excessive instability when the vehicle is backed.

It is a further important object of the present invention to provide a tandem axle suspension unit which is automatically responsive to deviation of the vehicle from straight line travel to provide a relative shift of the axles in the tandem assembly so that the axes of all vehicle wheels pass substantially through a common point while the axis of the front axle of the tandem axle assembly remains at approximately right angles to the longitudinal axis of the vehicle.

It is a still further object of the present invention to provide a tandem axle suspension unit which is automatically responsive to deviation of the vehicle from straight line travel to provide a relative shift of one of the axles in the tandem assembly while the other axle remains substantially normal to the longitudinal axis of the vehicle chassis so that the axis of the one axle intersects the axis of the other axle at the center of the vehicles turning circle.

It is another object of the present invention to provide such a tandem axle suspension utilizing conventional leaf springs which have slideable connections with at least one of the axles thereof.

Further objects and advantages of the invention will become apparent upon reference to the specification and claims and to the annexed drawings wherein:

Figure 1 is a side view of a tandem axle suspension incorporating a preferred embodiment of the present invention;

Fig. 2 is a partial top plan view illustrating one side of the suspension of Figure 1, with certain chassis frame members and portions of some parts being omitted for clarity of disclosure;

Figure 3 is a fragmentary end elevation partly in section illustrating the rear axle lower torque rod detail;

Figure 4 is a fragmentary end elevation, partially in section, and taken substantially along line 4—4 of Figure 1;

Figure 5 is a schematic diagram of a vehicle equipped with the self-steering tandem axle suspension of the invention travelling along a straight path;

Figure 6 is a schematic diagram of the vehicle of Figure 5 during a turn; and

Figure 7 is a schematic diagram of a tractor-trailer type vehicle equipped with a tandem axle suspension according to the invention during a turn.

Figure 8 is a detail plan view of a straddle mount bracket for securing the rearward end of the lower right rear torque rod.

Referring to the drawings, particularly Figures 1 and 2, there is shown a tandem axle suspension or bogie unit 10 which comprises spaced parallel drive axle assemblies 12 and 14, hereinafter referred to as the front rear axle and rear rear axle, respectively, connected to support a vehicle chassis frame 16 in a manner described in detail below. The forward drive axle 12 may or may not be equipped with an interaxle differential 18. A main propeller drive shaft (not shown) drives the pinion shaft 20 of the front rear axle 12, and a second propeller drive shaft (not shown) extends from the front rear axle pinion shaft 20 to the rear rear axle pinion shaft 22, as may be seen in Figure 2.

Referring to Figures 1 and 4, a pair of depending side brackets 24 (only one of which is shown) are bolted at 26 to long side frame members 28 and to cross frame member 40 of chassis 16, one at each side of the vehicle. Brackets 24 comprise upper and lower sections 42 and 44 bolted together at 46 to form a boss 48 having a circular bore 50 extending therethrough. A cross tube 52, only one end of which is shown, is non-rotatably supported on the chassis by securing it adjacent each end in bores 50 of brackets 24 as by bolts 54, as shown in Figure 4.

Each end of cross tube 52 extends outwardly from the brackets 24 to form a pair of trunnions 56 (only one of which is shown) for receiving a spring seat 58 which has a platform section 60 and a boss section 62 having a bore 64 extending therethrough. Spring seat 58 is mounted on trunnion 56 by means of a resilient bushing 66 comprising a rubber sleeve 68 firmly held under radial compression between outer steel sleeve 69 and inner steel sleeve 70, with the outer sleeve 69 being press fitted into bore 64 of the spring seat boss. The sub-assembly comprising spring seat 58 and bushing 66 is mounted on the end of trunnion 56 and held in place by means of an annular cap plate 72 pressed against one end thereof by a bolt 74 threaded into annular ring 71 which is welded or otherwise secured at the open end of trunnion 56, as indicated in Figure 4. Bushing 66 resiliently permits spring seat 58 to rock relative to trunnion 56 and chassis frame 16, with the rubber sleeve 68 taking up all the torsion resulting from such relative rotation. Cap plate 72 and bolt 74 are enclosed by a cap 76 secured to the spring seat boss as by a plurality of screws 78.

A spring 80 is fastened to the spring seat platform by a plurality of U-bolts 82 on each side of the vehicle, outwardly of side brackets 24 and longitudinal side frame members 28, with each spring extending forwardly and rearwardly of the spring seat 58. The ends of springs 80 rest freely and slideably upon saddle pads 84 which form part of spring brackets 86. Brackets 86 have inner spring guide plates 87 for guiding the sides of the ends of springs 80 and an overhanging spring retaining arm 89. The spring brackets 86 are secured upon the axle housings 12 and 14 at each end thereof by four bolt assemblies 88 and, as illustrated in Figure 3, also fasten lower torque rod straddle mount brackets 90 to the rear axle. At one side of the vehicle longitudinally aligned upper torque rods 92 and 94 extend from opposite sides of bracket 24 to upper torque rod straddle mount brackets 96 on axles 12 and 14.

Each torque rod is formed at both ends with an identical universal socket 98 having a chiefly spherical ball 100 having parallel flat sides 102 and oppositely extending integral arms 104 and 106 mounted therein. Arms 104 and 106 are of equal size and are formed with apertures therein for receiving mounting bolts. The opposite sides of each arm are flat, parallel and symmetrical with respect to the axis of ball 100 and perpendicular to the longitudinal axis of the torque rod.

The trunnion support bracket 24 on the left side of the vehicle frame is formed with an integral torque rod end straddle mounting portion 108 for connecting thereto the ends of the upper torque rods. This portion 108 is formed with two transversely aligned flat vertical mounting walls 110 on each side of the bracket facing each axle, as shown in Figures 1, 2 and 3. These walls serve for mounting the flat sided arms 104 and 106 of the upper torque rod end connections. A clearance space 112 is provided in bracket 24 for the adjacent end sockets of the torque rods. Two bolt assemblies 114 extend through the left side bracket 24 for mounting the torque rod ball arms with the flat faces thereof flush against the associated flat walls 110, as best seen in Figure 1.

As best shown in Figure 4, each side depending bracket 24 is formed with a torque rod end mounting bracket extension 116. Each such extension 116 extends outwardly from the lower section 44 of bracket 24 to straddle mount the inner end of the lower forward torque rod at that side. Bracket extension 116 is formed with a flat vertical mounting wall 118 (Figure 1) facing the front rear axle 12 and has a clearance recess 120 to accommodate socket 98 of the lower torque rod 124. Two bolt assemblies 126 extend through each bracket extension 116 for mounting the torque rod ball arms with their flat faces flush against the associated flat walls 118.

Each of the forward upper and lower torque rods and the rear upper torque rods is connected at its other end to one of the identical and interchangeable torque rod straddle mount brackets 96 secured to the axle housings. Each of these straddle mount brackets 96 comprises a saddle base 128 which is provided with bolting flanges 130. The saddle base 128 has projecting upwardly therefrom a pair of posts 132 and 134 which have a space 136 therebetween to clear the torque rod end sockets. Each post 132 and 134 has a pair of spaced parallel flat mounting faces on opposite sides thereof, the faces on adjacent posts lying in the same plane.

Each of the upper torque rod mounting brackets 96 for the upper torque rods 92 and 94 is mounted adjacent an inner end of its associated axle housing by four bolt assemblies 138 which pass through axle saddle brackets 139, as shown in Figure 3. The outer ends of all of the upper torque rods are connected to mounting brackets 96 by pairs of bolt assemblies 140. The forward ends of the lower torque rods 124 are likewise connected by means of bolt assemblies 140 to posts 142 on forward lower saddle mount brackets 96, which are bolted to the spring brackets 86. The torque rod saddle mount brackets 96 for the upper and lower forward torque rods and for the rear upper torque rods are interchangeable.

The foregoing forward torque rod arrangement provides a substantially parallelogram pantographic suspension and torquing arrangement for the front axle 12, the upper torque rod 92 and the lower torque rods 124 effectively resisting drive and braking torque at the axle and aiding in the preservation of the longitudinal spacing of the forward axle 12 in the suspension.

Referring more particularly to Figures 1, 3 and 4, the lower section 44 of the depending side bracket 24 is provided with a canted lower rear torque rod mounting bracket 150 which consists of a pair of flat coplanar mounting walls 152 and 154. The mounting walls 152 and 154 lie in a vertical plane which is at a 30° angle with respect to the cross tube 52. The socket 98 of the lower rear torque rod 156 is secured to the bracket 150 by means of bolt assemblies 158 which pass through the arms 104 and 106 of the spherical ball 100 in the socket and engage apertures in the walls 152 and 154. The lower rear torque rods 156 thus mounted extend rearwardly and outwardly from the brackets 24 on respective side frame members 28.

The other ends of the lower rear torque rods 156 are secured to the lower torque rod straddle mount brackets 90. Brackets 90 comprise a base 159 having four apertures 161 therein and a pair of plates 160 and 162 secured substantially normal thereto, as is best seen in Figure 8. The plates 160 and 162 are provided with mounting abutments 163 and 165 having mounting walls 167 and 169 which lie in a common plane substantially perpendicular to the plates 160 and 162. The plates 160 and 162 lie at an angle of approximately 30 degrees to a line connecting apertures 161 while the plane containing walls 167 and 169 lies at an angle of approximately 60 degrees to that line and at an angle of 30 degrees to the rear axle 14. The mounting abutments 163 and 165 are provided with bores 169' which receive bolt assemblies 164 to secure the rear sockets 98 of the rear lower torque rods 156 to the saddle mounting brackets 90.

The rear axle 14 is thus mounted so that upon axle side movement the lower torque rods 156 pivot about their forward universal joints which are secured to the lower sections 44 of the brackets 24.

Referring more particularly to Figures 5 and 6 there are shown wheel diagrams of a vehicle provided with the bogie unit of this invention. The vehicle is provided with a pair of front wheels 166 pivoted about pins 167 and controlled by a conventional drag link 168 and steering wheel 170. The bogie unit comprises a pair of axles 12 and 14 on which are mounted forward wheels 172 and rear wheels 174. The forward axle 12 is suspended from the forward upper torque rod 92 and the lower forward torque rods 124 which form a parallelogram pantograph support. The rear axle 14 is suspended by means of the upper rear torque rod 94 and the lower rear torque rods 156 which extend forwardly and inwardly. Referring to Figures 2 and 4, sidewise movement of the rear axle 14 is permitted and also limited by the resilient spring seat trunnion bushings 66, by side play between the ends of the spring 80 and the inner spring guide plates 87 and by negligible limited side flexing of the spring 80. Rear axle side sway from the straight forward trunnion position is so limited as to insure clearance between the chassis frame 28 and rear tires 174 and to prevent excessive instability when the vehicle is backed.

When a vehicle equipped with the improved self-steering tandem axle or bogie unit of this invention encounters a turn, forces at the wheels 172 and 174 move the forward tandem axle 12 toward the outside of the turn and the rear tandem axle toward the inside of the turn until the movement is checked by the spring or until the force causing movement disappears. When the front wheels 166 of a vehicle equipped with the improved tandem axle suspension unit are turned, the vehicle initially tends to turn about a point A on a transverse center line 176 through the tandem axle suspension unit 10. As the rear axle 14 shifts inwardly and is turned by means of the torque rod suspension 94 and 156 this point of turn shifts forward to a point B on a transverse center line through the front rear axle 12, as may be seen in Figure 6.

The tilt or horizontal swivelling of the rear axle 14 increases after the start of a turn and at the same time the force urging the rear axle 14 sidewise gradually decreases until a condition of stable equilibrium is reached with the rear axle wheels 174 tracking the curve of the turn. The improved bogie unit is thus automatic in operation and is inherently stable. Any sidewise displacement of the rear axle 14, as might be caused when a rear wheel 174 strikes a rut, causes a tilt in the rear axle 14 which immediately tends to return the axle and rear wheels to a true tracking state. The forward shift of the center of the turning circle from the point A to the point B and the easier steering thus made possible result in a vehicle having a shorter wheel base, thereby decreasing the vehicle turning radius. Tire wear is also reduced by the elimination of transverse sliding or skidding which is inherent with conventional tandem axle suspension units.

Vehicles utilizing the tandem axle suspension unit of this invention may have increased spacing between the tandem axles without introducing increased steering difficulties. This permits the use of larger tires and also a greater range of unequal load distribution for the tandem axles. Such unequal load distributions are frequently desired in order to increase traction in the case of pusher or puller type tandem units having one dead axle. While the illustrated embodiment of the invention has shown a tandem axle suspension unit having two driven axles, it will be apparent that either one or both of the axles may be dead. In addition to use on unitary vehicles the bogie unit of this invention can also be utilized with dead axles on trailers while obtaining the same self-steering advantages.

Referring to Figure 7, there is shown a trailer 178 equipped with a tandem axle suspension unit 182 having forward wheels 184 and rear wheels 186. The motive power is supplied by means of a tractor having drive wheels 188 and front wheels 190.

The minimum road width C required by a tractor-trailer unit is determined by the trailer and when the trailer is equipped with a self-steering tandem axle suspension unit of this invention this minimum road width is diminished because of the fact that the center of turn D of the tractor-trailer unit is shifted forward to the transverse center line 180 of the forward tandem axle.

The present invention thus provides an improved tandem axle suspension having a structurally simple and relatively inexpensive bracket and torque rod system and having a self contained, self-steering rear axle. The self-steering rear axle is inherently stable and properly tracks the motion of the vehicle both in straight travel and during turns. Easier steering is provided and the vehicle wheel base may be shortened to provide a decreased minimum turning radius. In addition the tandem axle spacing may be increased and a wider range of unequal load distribution utilized. The unit may be used with both tandem axles driven, with one tandem axle driven, or with both axles dead, either in self-propelled vehicles or trailers. Mechanical linkages between the steering column and steerable tandem axle suspension are not needed. In addition a large number of conventional torque rods and mounting brackets are utilized in connection with a simplified spring construction which requires no heavy and complex additions to the vehicle chassis. The entire tandem axle suspension may be manufactured as a unit and adapted to a wide variety of vehicles without any need of special design of the vehicle chassis.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tandem axle vehicle suspension adapted to be mounted beneath a vehicle chassis, relatively closely spaced tandem axles adapted to be supported at opposite ends by ground engaging wheels, brackets depending from said chassis, springs having their central portions secured to said brackets, spring brackets supported on said axles, said ends of said springs being supported on said spring brackets and having slideable connections with at least one of said axles permitting both lateral and angular displacement of said one axle relative to the other during normal operation of the vehicle, upper and lower torque rods operably connected between said one axle and said brackets for preventing rotation of said axle about its longitudinal axis, said lower torque rods being angularly disposed with relation to one another so as to permit and provide said displacement of said one axle during normal operation, and a second set of three torque rods operably connected between said bracket and the other of said tandem axles to form a parallelogram pantograph and to prevent rotation of said other axle about its longitudinal axis due to torque reactions and resisting angular displacement of said other axle relative to the chassis.

2. A suspension as set out in claim 1, said spring brackets including means for limiting said lateral and angular displacement of said one axle.

3. In a tandem axle suspension for a vehicle having a chassis, forward and rearward parallel transverse axles supported at opposite ends by ground engaging wheels, springs between the chassis and axles, a plurality of torque rods separate from the springs connected between the chassis and said axles, two of said torque rods extending divergently from a bracket structure on the chassis intermediate the axles to brackets on said rearward axle and each end of each torque rod comprising a ball segment mounted on the rod and having lateral mounting arms formed with flat bracket attachment faces disposed at right angles to the length of the rod and means providing cooperating flat rod arm attachment faces on said bracket structure and the respective axle brackets, the attachment faces on the bracket structure and bracket for opposite ends of each said torque rod being similarly disposed at an acute angle to the longitudinal axis of the vehicles, and the attachment faces for the respective torque rods being oppositely inclined with respect to said axis.

References Cited in the file of this patent

UNITED STATES PATENTS

| | | |
|---|---|---|
| 1,935,746 | Marcum | Nov. 21, 1933 |
| 2,227,448 | Freeman | Jan. 7, 1941 |
| 2,237,282 | Reed | Apr. 1, 1941 |
| 2,373,398 | Hoobler | Apr. 10, 1945 |
| 2,435,199 | Buchendale | Feb. 3, 1948 |
| 2,466,194 | Anderson et al. | Apr. 5, 1949 |
| 2,595,562 | Becker | May 6, 1952 |
| 2,662,781 | Hopson | Dec. 15, 1953 |